(12) United States Patent
Hoersch et al.

(10) Patent No.: US 7,589,311 B2
(45) Date of Patent: Sep. 15, 2009

(54) OPTOELECTRONIC SENSOR AND METHOD FOR DETECTING OBJECTS WITH POLARIZED LIGHT

(75) Inventors: Ingolf Hoersch, Emmendingen (DE); Felix Lang, Schliengen (DE); Rolf Meier, Ettenheim (DE)

(73) Assignee: Sick AG, Waldkirch (DE)

( * ) Notice: Subject to any disclaimer, the term of this patent is extended or adjusted under 35 U.S.C. 154(b) by 189 days.

(21) Appl. No.: 11/983,649

(22) Filed: Nov. 9, 2007

(65) Prior Publication Data
US 2009/0108185 A1  Apr. 30, 2009

(30) Foreign Application Priority Data
Nov. 11, 2006  (DE) ............... 10 2006 053 229

(51) Int. Cl.
*G01J 4/00* (2006.01)
(52) U.S. Cl. .................... 250/221; 250/216
(58) Field of Classification Search ............. 250/221, 250/216, 225
See application file for complete search history.

(56) References Cited

U.S. PATENT DOCUMENTS 7,417,217 B2 *  8/2008  Deguchi et al. ............ 250/221

FOREIGN PATENT DOCUMENTS

| DE | 42 38 116 C2 | 11/1992 |
|---|---|---|
| DE | 198 58 769 A1 | 12/1998 |
| DE | 199 13 156 B4 | 3/1999 |
| DE | 100 16 892 B4 | 4/2000 |
| DE | 10 2005 013 317 A1 | 3/2005 |
| DE | 10 2005 016 375 A1 | 4/2005 |
| DE | 20 2005 006 736 U1 | 4/2005 |

OTHER PUBLICATIONS

Naumann, Helmut and G. Schroeder, "Fundamentals of Optics, Handbook of Technical Optics," Carl Hanser Verlag Muenchen Wien, pp. 185-188, 5th Edition (1987).

* cited by examiner

*Primary Examiner*—Georgia Y Epps
*Assistant Examiner*—Tony Ko
(74) *Attorney, Agent, or Firm*—Townsend and Townsend and Crew, LLP

(57) ABSTRACT

A method and apparatus for detecting objects has a sensor with a light source, a light receiver, and a light retroreflector between them. Light from the source is transmitted to the detector along a light transmission path from the source to the retroreflector and is reflected back to the detector along a light reflection path that substantially corresponds to the transmission path. A single lens or a pair of adjacent lenses shapes the respective light beams from both light emitted by the source and light reflected by the retroreflector in accordance with either the auto collimation principle or the double-eye principle, respectively. A polarizer and a beam splitter are arranged in the light transmission path for light from the source, and a polarization filter is arranged in the light reflection path so that light reflected by the retroreflector passes through the beam splitter and the polarization filter before it reaches the light receiver. A control unit recognizes an interruption of at least one of the light beams as the detection of an object in the light transmission and/or light reflection paths. The beam splitter is a dielectricum which has differing transmission and reflection characteristics for p-polarized light and s-polarized light.

15 Claims, 3 Drawing Sheets

OPTOELECTRONIC SENSOR AND METHOD FOR DETECTING OBJECTS WITH POLARIZED LIGHT

RELATED APPLICATIONS

This application claims priority from German patent application No. 10 2006 053 229.5 filed Nov. 11, 2006, the disclosure of which is incorporated herein by reference.

BACKGROUND OF THE INVENTION

This invention relates to optoelectronic sensors as well as a method for detecting objects with light beams emitted by a light source and, following reflection, received by a light receiver.

Optoelectronic sensors are often used for detecting the intrusion of objects into monitored regions. They are used in a variety of ways, from motion detectors via burglary protection to securing automatic doors. The detection of objects is also of importance in the automation industry.

A reflection light barrier is an example of an object detecting sensor which, generally speaking, has a light source, such as an LED, that emits a beam which strikes a retroreflector at the opposite end of the monitored region. The reflector returns the light, and the reflected beam is then detected by a light receiver arranged proximate the light source. When the light beam is interrupted, the light receiver receives nothing and initiates a deactivation function or signal.

Emitted and reflected light are directed through beam shaping optics. When the optics for the emitted and reflected beams is the same, it is referred to as auto collimation. Alternatively, a separate lens can be provided for the light source and the light receiver according to the double-eye principle wherein the two lenses are arranged in close proximity to each other.

An erroneous signal or deactivation function can be encountered with light barriers when a light reflecting or very bright object enters the light transmission path from the source to the retroreflector and/or the light reflecting path from the retroreflector to the light receiver. Such an object can generate so much light that the light barrier is no longer able to recognize an interruption of the light beam. Such interruptions are sometimes also referred to as mirror or white light security.

Conventionally, such problems are solved with polarized light. For this, the emitted beam is polarized. The retroreflector maintains the polarization, and a polarization filter is arranged in front of the light receiver, which is optically crossed relative to the polarizer, and therefore permits unimpeded passage of the received light beam. However, when the emitted light beam strikes a mirror or a bright object, the light will be polarized in the wrong direction or loses its polarization altogether. As a result, the received light beam is overpowered by the light from the mirror and/or a bright object so that the mirror or bright object is interpreted as an interruption of the light beam.

It is also known to use a physical beam splitter for reflective light barriers, such as a metalized glass or plastic substrate, for separating the emitted light beam from the reflected beam. These are normally 50:50 beam splitter plates with glass surfaces of high optical quality onto which thin metal layers are deposited to effect partial reflections.

However, the use of such 50:50 beam splitters has a number of disadvantages and problems. Relative to the overall cost of a reflection light barrier, the beam splitter constitutes a high-value optical component that is costly. Since the beam splitter causes a 50% loss of light intensity in the emitted light beam, the light spot on an object to be detected or on the retroreflector is weak and difficult to see. This makes it substantially more difficult to manually align the light barrier. Since the signal detected by the light receiver is twice reduced by 50%, the maximal possible reach of the light barrier is relatively short.

Light remitted by a mirror or a bright object also includes a light component that is properly oriented for the polarization filter. As a result, very bright or highly reflective objects can erroneously provide a receiving signal. Reflection light barriers are therefore not entirely secure against mirror or white light interferences.

In addition, 50% is a significant portion of the emitted light which must be internally absorbed by directing it to a tubular cavity or the like of the light barrier housing where it must be diffused. Such light constitutes interference light or an optical overlay and must be suppressed with a costly barrier or separation member. Since a significant part of the surrounding light from the same reflecting source also enters the reflected light beam, such light is received by the light receiver and can adversely affect its function. It is possible, however, to alleviate the last two problems with a polarization filter.

BRIEF SUMMARY OF THE INVENTION

It is therefore an object of the present invention to improve the reliability and reach of sensors discussed above in a cost-saving manner.

According to the present invention, this is in part attained by providing an improved, yet much less costly, beam splitter that is placed in the optical path from the light source to the retroreflector and back to a light receiver. The present invention eliminates the need for costly beam splitters and increases the reach of the sensor as well as its mirror and/or white light security. At the same time, an optical overlay from part of the emitted light beam reflected by the beam splitter into the housing and interference from surrounding stray light are significantly reduced. Due to the greater light intensity, the light spot on the reflector becomes more visible, which makes manual adjustments easier to perform.

A basis for these improvements is that in accordance with the present invention the light in the emitted and reflected light paths is not simply divided in half. Instead, the characteristics of the dielectricum are advantageously made use of by reflecting and transmitting light of different polarization directions in different proportions. With the help of a retroreflector, which turns the polarization of the light, it becomes possible to make advantageous use of the asymmetric reflection and transmission characteristics for both the emitted and reflected light.

It is preferred to use as the beam splitter a glass plate that is free of layers, such as metallic layers, applied to its surfaces. This saves significant costs, and since glass is widely used in optical arrangements, it is well known how such glass can be produced and worked on.

In a preferred embodiment, the sensor is a light barrier or a light barrier grid, and the control for it is configured to generate a warning or deactivation signal when an object is recognized. The high mirror and white light security attained with the present invention is of particular importance for security applications.

The light source is preferably a source of visible, ultraviolet or infrared light, and it is further preferred that it is a laser diode. Visible light has the advantage that it facilitates manual adjustments. Ultraviolet and infrared light renders the light invisible and thereby provides protection against vandalism because the sensor does not generate a light spot that might attract attention. The absence of a light spot can also be of advantage in certain applications because it does not draw attention to the presence of the sensor.

It is preferred that the optical axes of the light source and the light receiver are perpendicular to each other. The beam splitter is positioned at the intersection of the two optical axes and arranged at an angle of 45° relative to both optical axes. As will be further explained below, this angle is particularly advantageous with regard to mirror and white light security, increasing the reach of the sensor, as well as preventing optical overlays or the adverse effects caused by stray or outside light.

Alternatively, the optical axes of the light source and the right receiver are at an angle relative to each other of 180° less twice the Brewster angle of the dielectricum. In this alternative, the beam splitter is at the Brewster angle relative to the optical axis of the light source, and it is positioned at the intersection of both optical axes. As a result, the beam splitter functions simultaneously as a polarizer and a polarization filter. In this embodiment of the invention, there is no need to provide a separate polarizer for the emitted beam and a separate polarization filter for the received beam. This embodiment of the invention is therefore even less costly.

The method of the present invention provides like advantages.

DESCRIPTION OF THE PREFERRED EMBODIMENTS

Figure 1:
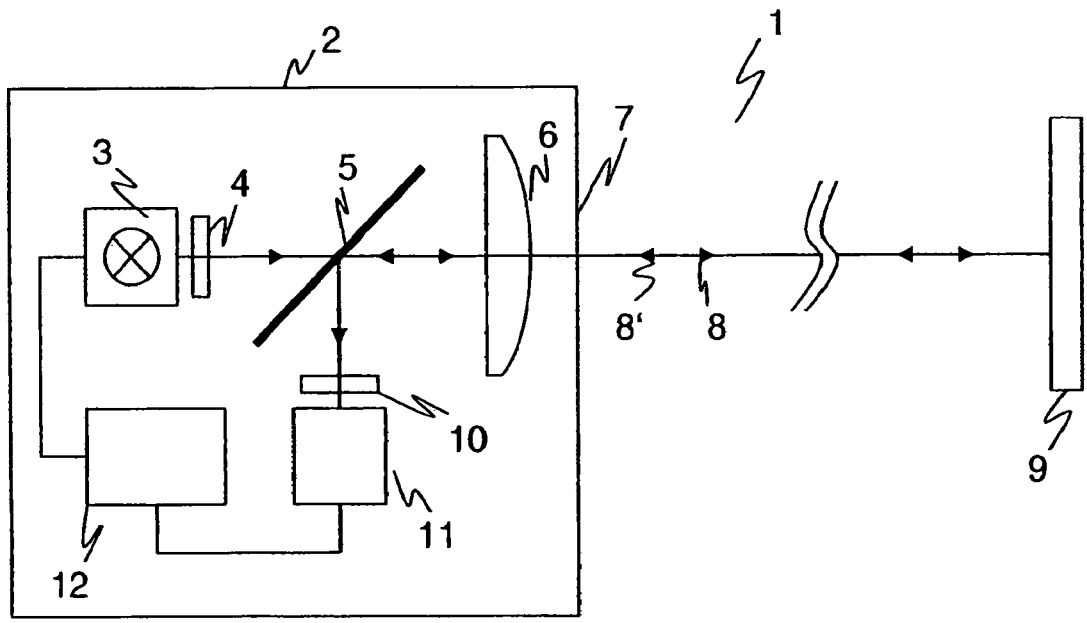
FIG. 1 shows a sensor constructed in accordance with a first embodiment of the invention with a beam splitter inclined at 45° and using polarizers.

FIG. 1 shows a sensor 1 constructed in accordance with the present invention. Sensor 1 is preferably a reflection-type light barrier that can be used alone or as part of a light barrier grid.

A light emitting source 3 is arranged in a housing 2 of the sensor. The light source can be an LED or a laser of any desired wave length, including but not limited to visible infrared and ultraviolet light. Light from the source is directed through a polarizer to a beam splitter 5 that is at an angle of 45° relative to light source 3 and is a dielectricum, preferably a glass plate that has no surface layers applied to it.

Beam splitter 5 reflects a portion of the light. To prevent or at least limit optical cross-talk within housing 2, the reflected light must be absorbed within the housing or in other ways not illustrated in the drawings. The remainder of the light is transmitted through the beam splitter and then along a light transmission path 8 via a beam shaping optics 6 and a viewing or sight window 7 in the housing to a retroreflector 9. The reflection and transmission properties of beam splitter 5 and the respective polarization directions of the light form the present invention and are further explained below.

The emitted light strikes retroreflector 9 where it undergoes a three-fold total reflection after which the light is turned back on itself. The light therefore returns as a beam along a light reflection path 8' that deviates from light transmission path 8 only negligibly due to minimal offsets of an order of magnitude of the size of the microreflectors of retroreflector 9 and unavoidable optic transmission and/or reflection errors encountered along the optical paths. The reflected beam enters housing 2 through sight window 7 and strikes beam splitter 5 following beam shaping in beam shaping optics 6.

The beam shaping optics can be a simple converging lens or any other element known to those of ordinary skill in optics to attain the same effect. Instead of using a lens 6 for auto collimation, a double lens according to the double-eye principle can be used. In the latter event, one lens is provided for light path 8 and another one for reflection path 8'. The beam shaping optics 6 can be arranged in sight window 7 or can itself form the sight window.

Beam splitter 5 transmits a portion of the received light reflected by retroreflector 9 and strikes light source 3. This light is of no further use. The remaining portion of the received light is reflected by the beam splitter via a polarization filter 10 that has a polarization direction which is perpendicular to that of polarizer 4 and is then directed to a light receiver 11 where it is converted into an electric signal, for example with a photo diode, a CCD chip, or a CMOS chip.

This electric signal is received by a control unit 12. The control unit recognizes whether the light from light source 3 was interrupted. When no signal is received by the control unit that corresponds to the receipt of a reflected beam, the control unit interprets this as an interruption of the beam caused by an object in one or both of the beam paths. In such a case, control unit 12 generates a signal that indicates the presence of an object. The signal can be used to control processes in the automatization industry or, in the alternative, as a warning signal or a deactivation signal for an associated machine. Control unit 12 can also be coupled with light source 3, for example to turn the source on and off.

Figure 2:
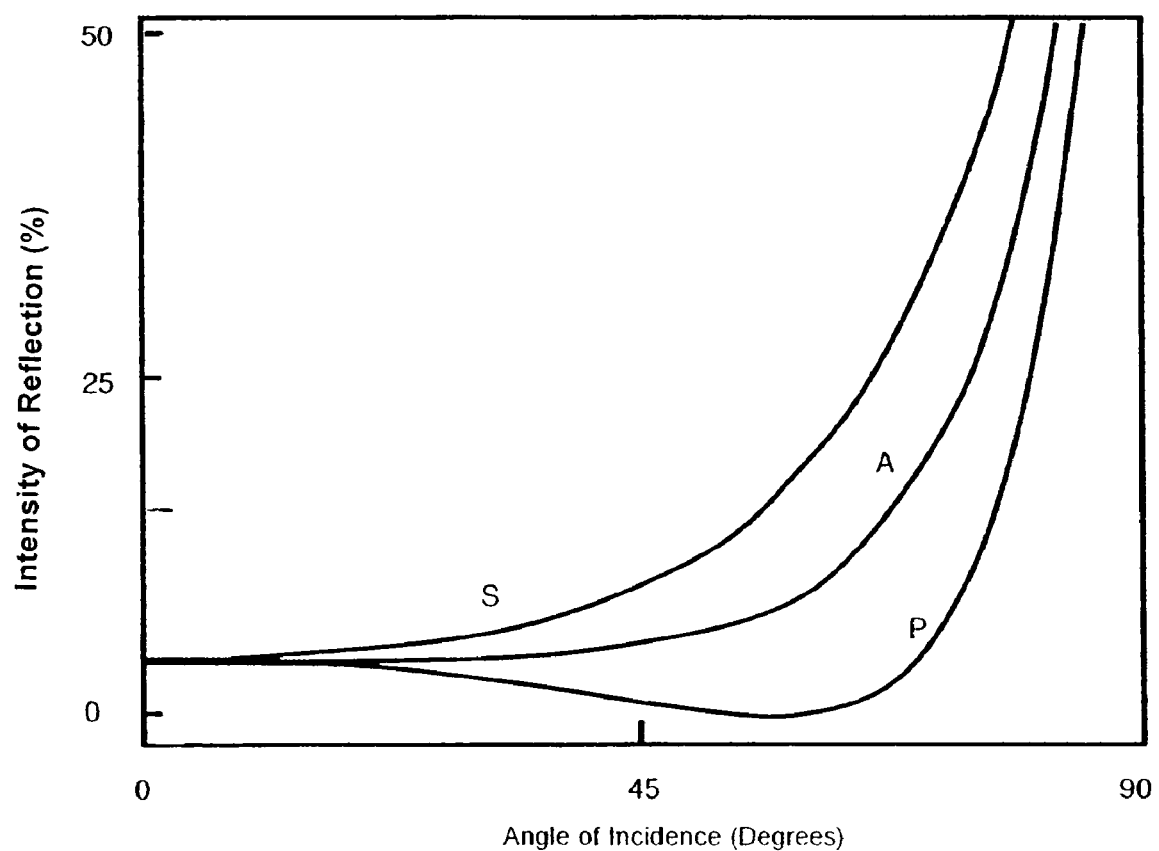
FIG. 2 is a diagram which illustrates the reflection of differently polarized lights at an air-glass interface as an example of a useable dielectricum.
Figure 3:
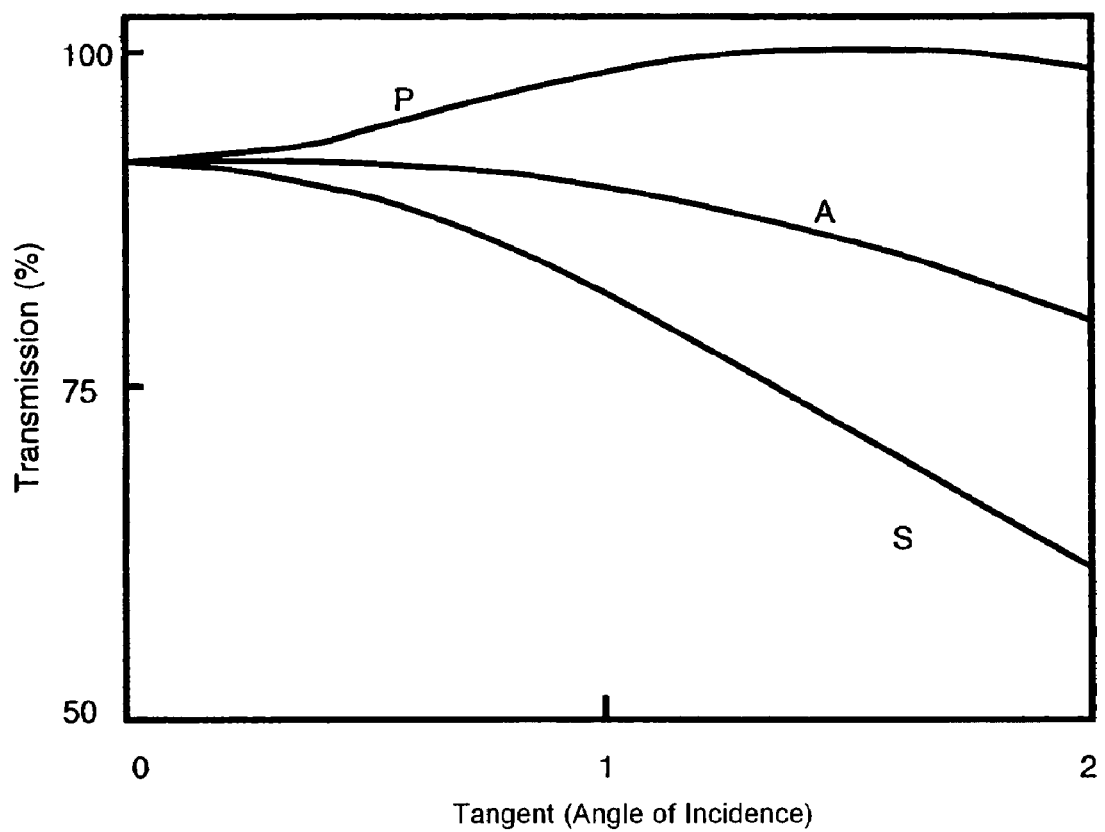
FIG. 3 is a diagram which shows the transmission behavior caused by an inclined beam splitter plate made of glass.
Figure 4:
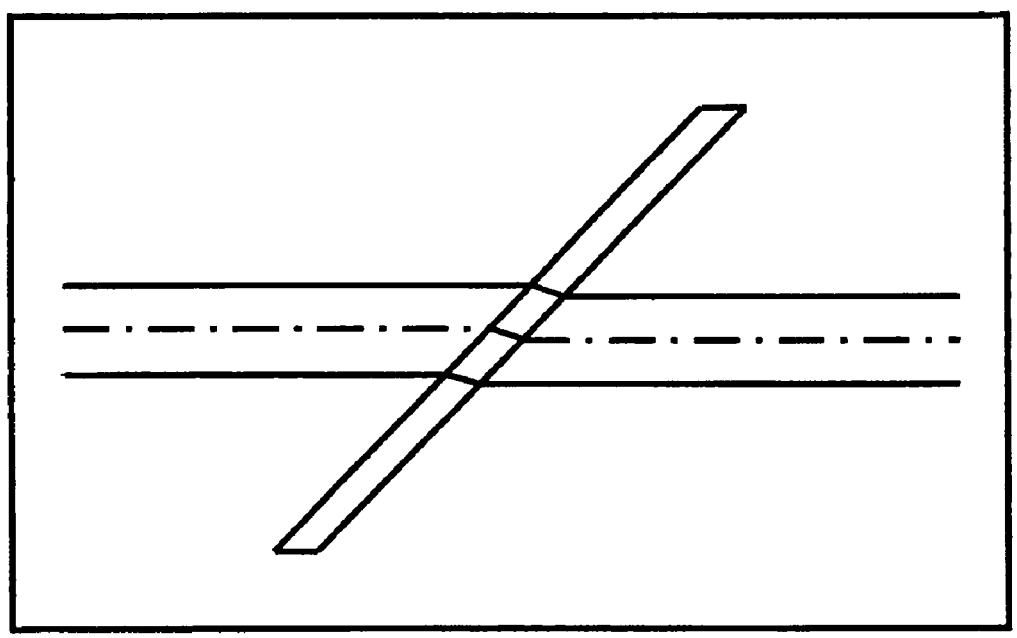
FIG. 4 illustrates the light beam extending through a beam splitter plate as assistance for explaining the graph of FIG. 3.

FIGS. 2, 3 and 4 show the different transmission and reflection behaviors of a dielectricum. As an example, the graphs in these figures are for the characteristics of surface layer-free glass.

FIG. 2 shows the intensity of the reflected light portion versus the angle of incidence for s-polarized, p-polarized and unpolarized light for a simple transition of an air-glass interface. At a relatively large angle of about 45°, the reflection curves strongly diverge. Especially p-polarized light is significantly less reflected than the s-polarized light.

FIG. 3 shows the intensity of the s-polarized, p-polarized and unpolarized light versus the tangent of the angle of incidence when transmitted through a beam splitter 5. Here too a pronounced divergence at a relatively large angle of about 45° can be seen; p-polarized light is significantly better transmitted than the s-polarized light.

The data for the curves of FIGS. 2 and 3 result from simulations. In each instance, it was assumed that glass of a diffraction class 7 is used and for purposes of FIG. 3 that the glass has a thickness of 1 mm. FIG. 4 illustrates the progress of a light beam through a glass plate in the simulation for what is shown in FIG. 3.

The following numerical examples demonstrate the improved characteristics of a dielectricum for beam splitter 5 as contrasted with the characteristics of a 50:50 beam splitter to which surface layers have been conventionally applied. Similar to FIG. 2, it is based on a double air-glass surface interface transit and an angle of incidence of 45° as was also used in the above-described embodiment of the invention.

The results are shown in the following Table 1:

TABLE 1

|  | Unpolarized | p-polarized | s-polarized |
|---|---|---|---|
| Glass plate |  |  |  |
| Relative transmission (%) | 90 | 98 | 82 |
| Relative reflection (%) | 10 | 2 | 18 |
| 50:50 Beam splitter |  |  |  |
| Relative transmission (%) | 50 | 50 | 50 |
| Relative reflection (%) | 50 | 50 | 50 |

As is readily discernible, a physical beam splitter with a 50:50 characteristic does not distinguish between polarization directions. In contrast thereto, a dielectricum in the form of a glass plate prefers the p-polarization over the s-polarization for transmissions and the s-polarization over p-polarization for reflections. The present invention takes advantage of this asymmetry in both the emitted and reflected light paths twice because the three-fold internal total reflection of the light in the retroreflector reverses the polarization direction three times, thereby rotating the polarization in net effect once.

It should be stressed that precise numerical values are not important. What is important is a sufficient diversion between the p-polarization and the s-polarization which, according to FIGS. 2 and 3, is not only true at 45° but over a much wider angular range. As a result, the material for beam splitter 5 can be selected from a wide variety possible materials so long as they exhibit reflection and transmission characteristics that are dependent on the polarization direction.

The following traces the light path and the polarization in actual use. In the embodiment of FIG. 1, the polarizer 4 must be p-polarizing, and polarizing filter 10 must be optically crossed and therefore s-polarizing. It is of course possible to reverse the light source 3 and light receiver 11. In that case, the polarizers and polarization filter 4 would not be changed because s-polarized emitted light must first be reflected by beam splitter 5 and later p-polarized received light is needed at beam splitter 5 for transmission.

Returning to the embodiment shown in FIG. 1, p-polarized light is directed from light source 3 via polarizer 4 onto beam splitter 5. Of this light, defined as 100% of the amount of available light according to Table 1, 98% is transmitted by beam splitter 5.

The p-polarized light is rotated into s-polarized light by retroreflector 9 with an efficiency of c1. According to Table 1, the s-polarized light is then reflected by beam splitter 5 with an efficiency of 18% to light receiver 11. The polarization filter 11 permits unimpeded passage of the s-polarized light. As a result, a signal is generated that has the strength of 98%*c1*18%, or c1*17.6%.

The comparable value for a 50:50 beam splitter is 50%*c1*50%=25%* c1 because the 50:50 beam splitter treats p-polarized and s-polarized light the same.

For comparison, assuming that the reflection efficiency of a white or a polarization destroying bright object in the light path at the mirror is c2 and the polarization destruction efficiency at a bright object ("white target") is c3, the following Table 2 results from calculations analogous to the one above. It should be noted that the emitted light is p-polarized by polarizer 4, and its reflection at the retroreflector turns the polarization. At the mirror surface the polarization is maintained and at a bright object the polarization is destroyed. The values for the correct polarization must therefore be taken from Table 1.

TABLE 2

|  | Retro-reflector | Mirror | Bright object |
|---|---|---|---|
| Glass plate |  |  |  |
| Relative transmission of emitted beam at the beam splitter (%) | 98 | 98 | 98 |
| Reflection at the target (%) | 18*c1 | 2*c2 | 10*c3 |
| Combined signal following reflection of the received beam by the beam splitter (%) | 17.6*c1 | 1.96*c2 | 9.8*c3 |
| 50:50 Beam splitter |  |  |  |
| Relative transmission of the emitted beam through the beam splitter (%) | 50 | 50 | 50 |
| Reflection at the target (%) | 50*c1 | 50*c2 | 50*c3 |
| Combined signal following reflection of the received beam by the beam splitter (%) | 25*c1 | 25*c2 | 25*c3 | wherein
c1 is the efficiency of the polarization rotation by the retroreflector
c2 is the efficiency of the polarization maintaining reflection at the mirror
c3 is the efficiency of the polarization destruction by the bright object As is readily apparent from Table 2, the total combined signal is stronger for a 50:50 beam splitter. However, the loss of 26/17.6 is sufficiently small so that it can be readily compensated for by using a correspondingly stronger light source 3 because what is important are not absolute values, but the proportional signal values. This will be explained by way of characteristic values which demonstrate the earlier mentioned disadvantages of 50:50 beam splitters with applied metal surface layers.

Initially the visibility of the emitted beam is the portion transmitted by beam splitter 5. According to Table 2, it is 98% for the beam splitter 5 of the present invention and 50% for a conventional 50:50 beam splitter, so that they differ by a factor of practically 2.

The mirror security for a conventional 50:50 beam splitter is the quotient of the combined signal by reflection at retroreflector 9 to the combined signal by reflection at a mirror surface in the beam path. In accordance with Table 2, it is 25%*c1/25%*c2, or c1/c2. The comparable value for the present invention is 17.6%*c1/1.96%*c2, or approximately 8.8*c1/c2. By taking the ratio of this, the constants c1, c2 are eliminated and it can be seen that the mirror security is enhanced by a factor of 8.8.

In an analogous manner, an improvement factor of 17.6/9.8, or 1.8, can be calculated as the improved white light security by reflection from a polarization destroying bright object.

Due to the squared intensity reduction with distance, the reach of sensor 1 is sqrt (1.76) or 130%, with reference to the white light security. For mirror security alone, the value would be significantly higher.

The internal optical cross-talk threshold is that amount of light from light source 3 that is reflected by beam splitter 5 (in FIG. 1 in an upward direction). In accordance with the present invention, this portion of the light, which could cause optical cross-talk, is only 2%. In comparison, it is 50% for a conventional 50:50 beam splitter. Thus, in accordance with the present invention the optical cross-talk threshold is reduced by a factor of 25.

Unpolarized stray light which strikes light receiver 11 corresponds to a light reflected by beam splitter 5 and therefore amounts in accordance with the present invention to 10% as compared to 50% for a 50:50 beam splitter. Thus, the stray light signal is reduced by a factor of 5.

It is once again pointed out that in these comparisons, the constants c1, c2 and c3 cancel out and therefore do not affect the end result.

The following Table 3 summarizes the improved use of the light in accordance with the present invention.

TABLE 3

| | Improvement factor in accordance with the invention caused by dielectricum | Interpretation |
| --- | --- | --- |
| Visibility of emitted beam on test sample | 98/50 = 2 | Two-fold brightness of emitted beam and therewith improved visibility of the emitted beam |
| Safety factor for polarization maintaining reflection (mirror) | 17.6/1.96 = 8.8 | More than 8-times improved security to prevent wrong switching due to mirror |
| Safety factor for diffused, polarization destroying reflection (white target) | 17.6/9.8 = 1.8 | 1.8-improved security for preventing wrong switching due to white objects |
| Reach of system | sqrt(1.76) = 132% | 30% improved reach (when set for white security) |
| Internal optical cross-talk at the beam splitter | 2/50 = 1/25 | Internal optical cross-talk threshold is lowered to 1/25 |
| Receiving threshold for unpolarized stray light | 10/50 = 1/5 | Stray light signal is reduced to 1/5 |

These advantages are attained even though beam splitter 5 is a less costly component, because, for example, it can be a simple glass plate instead of a 50:50 beam splitter made of high quality glass to which metal surface layers are applied, for example by vapor deposition.

Figure 5:
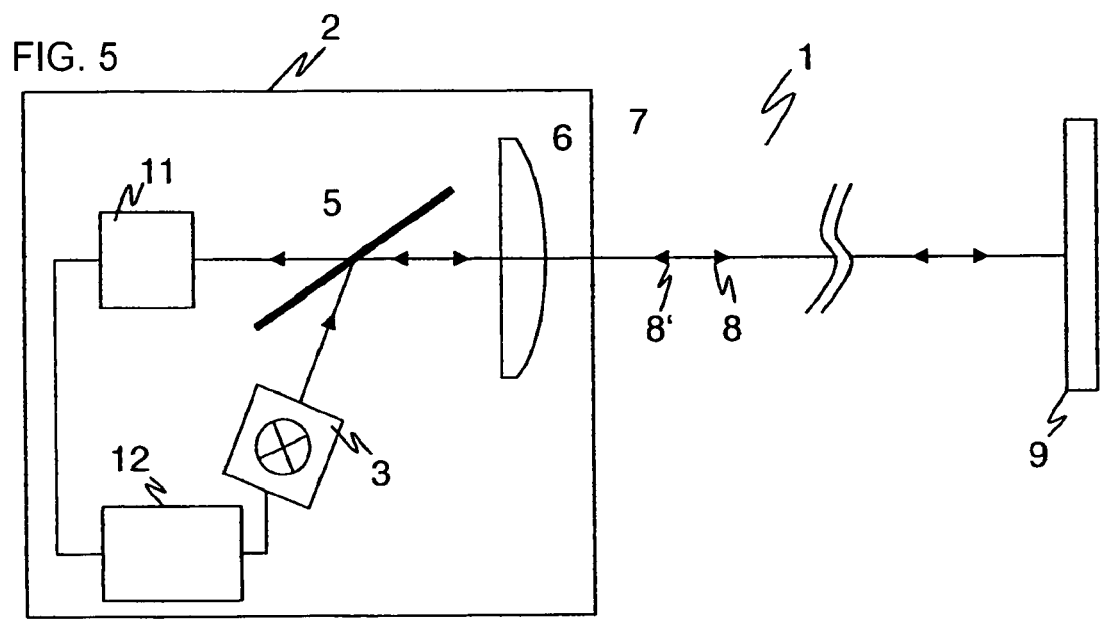
FIG. 5 shows a sensor constructed in accordance with a second embodiment of the invention in which the beam splitter is inclined at the Brewster angle and no polarizers are used.

FIG. 5 shows a second embodiment of the present invention. It is similar to the embodiment shown in FIG. 1, and the same reference numerals are used for like elements. The underlying principle of the invention and the advantages derived therefrom remain the same.

In contrast to the first embodiment of the invention, the optical axis of light source 3 in this second embodiment of the invention is the Brewster angle relative to beam splitter 5, which, for glass, is 56%. This way the beam splitter simultaneously acts as polarizer 4 because with the Brewster angle only s-polarized light is reflected into light transmission path 8. Following the turning reflection at retroreflector 9, also under the Brewster angle, the now p-polarized reflected light is completely transmitted by beam splitter 5. In this manner, the polarization filter 10 can be eliminated and the beam splitter 5 simultaneously functions as beam splitter, polarizer and polarization filter 10.

Contrary to the first embodiment, the optical axes of light source 3 and light receiver 11 are not perpendicular to each other. They are arranged so that the light in light transmission path 8 and light reflection path 8' are at the Brewster angle. The angle, at which the optical axes of light source 3 and light receiver 11 must be positioned, can be calculated with elementary geometry as 180°-2*Brewster angle.

Thus, the second embodiment of the present invention has the additional advantage that separate polarizers and polarization filters can be eliminated, which provides significant cost savings.

What is claimed is:

1. An optoelectronic sensor for detecting objects comprising
at least one light source, at least one light receiver, and a light retroreflector between them arranged for transmitting light from the source to the detector along a light transmission path from the source to the retroreflector and back to the detector along a light reflection path that substantially corresponds to the transmission path,
one of a single lens and a pair of adjacent lenses for shaping respective light beams from both light emitted by the source and light reflected by the retroreflector in accordance with one of the auto collimation principle and the double-eye principle, respectively,
a polarizer and a beam splitter in the light transmission path for light from the source,
a polarization filter in the light reflection path arranged so that light reflected by the retroreflector passes through the beam splitter and the polarization filter, and
a control unit configured to recognize an interruption of at least one of the light beams as a detection of an object,
the beam splitter comprising a dielectricum which has differing transmission and reflection characteristics for p-polarized light and s-polarized light.

2. A sensor according to claim 1 wherein the beam splitter is a glass plate which is free of a surface layer applied to the glass plate.

3. A sensor according to claim 1 wherein the sensor comprises one of a light barrier and a light grid, and wherein the control unit is configured to generate one of a warning signal and a deactivation signal in response to detecting an object.

4. A sensor according to claim 1 wherein the light source comprises one of a visible light source, an ultraviolet light source and an infrared light source.

5. A sensor according to claim 1 wherein the light source comprises a laser diode.

6. A sensor according to claim 1 wherein optical axes of the light source and the light receiver are perpendicular to each other, wherein the beam splitter is positioned where the optical axes intersect and is arranged at an angle of 45° relative to the optical axes.

7. A sensor according to claim 1 wherein optical axes of the light source and the light receiver are oriented relative to each other at an angle of 180° less twice a Brewster angle for the dielectricum, and wherein the beam splitter is arranged with respect to the optical axis of the light source at the Brewster angle where the optical axes intersect so that the beam splitter simultaneously defines the polarizer and the polarization filter.

8. A method for detecting objects comprising
directing light from a light source to a retroreflector along a light transmission path and back from the retroreflector to a light receiver along a light reflection path that substantially corresponds to the light transmission path,
shaping the light from the source and the light reflected by the retroreflector into respective beams in accordance with one of the auto collimation principle and the double-eye principle,
polarizing light emitted by the source,
splitting light from the source by passing a portion of the light through a dielectricum which has differing transmission and reflection characteristics for p-polarized light and s-polarized light, directing the portion of the light along the light transmission path to the retroreflector, returning light reflected by the retroreflector to the light detector along the light reflection path and through a polarizing filter and a beam splitter, and recognizing an interruption of at least one of the light beams as a detection of an object.

9. A method according to claim 8 wherein splitting includes directing the light to a glass plate free of a surface layer applied to it.

10. A method according to claim 8 wherein the light beams comprise one of a light barrier and a light grid.

11. A method according to claim 8 including generating one of a warning signal and a deactivation signal in response to the detection of the object.

12. A method according to claim 8 wherein directing light comprises directing one of visible light, ultraviolet light and infrared light.

13. A method according to claim 8 wherein directing comprises using laser light.

14. A method according to claim 8 wherein splitting and returning comprise splitting the light relative to optical axes from the source and from the light receiver at an angle of 45°.

15. A method according to claim 8 wherein splitting the light comprises splitting the light from the source at the Brewster angle relative to the optical axis of the source so that splitting the light from the source simultaneously polarizes the light, polarized light travels along the transmission path to the retroreflector, and polarized light is received by the light receiver.

* * * * *